UNITED STATES PATENT OFFICE.

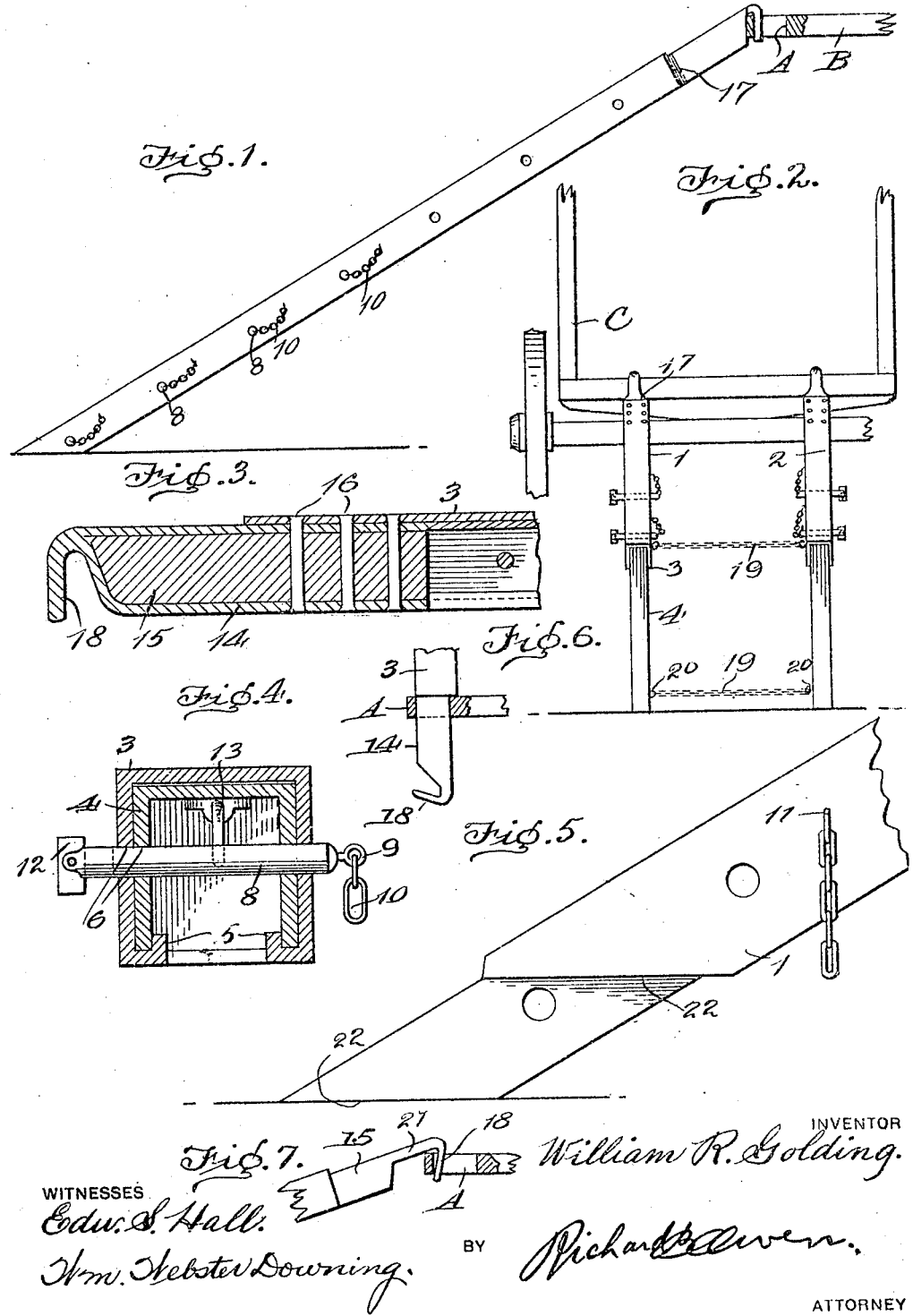

WILLIAM R. GOLDING, OF BROOKLYN, NEW YORK.

COMBINATION SKID AND STANDARD.

1,293,083.  Specification of Letters Patent.  Patented Feb. 4, 1919.

Application filed December 23, 1915. Serial No. 68,406.

*To all whom it may concern:*

Be it known that I, WILLIAM R. GOLDING, a citizen of the United States, residing at Brooklyn, in the county of Kings and State of New York, have invented certain new and useful Improvements in Combination Skids and Standards, of which the following is a specification.

My invention relates to a combination truck attachment and more particularly to a combination and adjustable truck skid and standards.

The primary object of my invention resides in the provision of a plurality of members for serving as a skid or as standards, each of the members comprising two sections telescopically associated with each other and novel means being also provided for removably retaining the sections in various adjusted positions.

Another object of my invention resides in the provision of novel flexible means for connecting the section of each member to the sections of the adjacent member.

A further object of my invention resides in the provision of a novel means for removably connecting the members to a truck body so that they will serve as a skid as well as novel means for removably connecting the members so that they will serve as standards.

A still further object of my invention resides in the provision of novel means for telescopically associating the sections with each other so as to facilitate equal adjustment thereof when desired.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a side elevational view of my invention associated with a truck body serving as a skid;

Fig. 2 is a rear end elevational view of my invention serving as a skid and arranged in an extended position;

Fig. 3 is an enlarged longitudinal sectional view of the preferred form of hook for connecting the members to the truck body when the invention is used in the capacity of a skid;

Fig. 4 is an enlarged transverse sectional view through the sections of the members illustrating to advantage the construction thereof and the means for removably holding the sections in an adjusted position;

Fig. 5 is an enlarged side elevational view of my invention in an extended position when used as skid;

Fig. 6 is a fragmentary side elevational view of one of the members when used as a standard; and Fig. 7 is a fragmentary side elevational view partly in section illustrating the modified form of hook showing the hook arranged so that the members will serve as a skid and which is capable of being swung without being removed to serve as a standard.

Referring more particularly to the drawings in which similar reference numerals designate like or corresponding parts throughout the different views I have associated with an oblong opening A in the bottom B of a truck body C my novel combination skid and standards.

In the present instance the device embodies a pair of members 1 and 2 which serve to provide a skid or act as standards or rungs. Each of the members includes adjustable telescopic and preferably channel shaped sections 3 and 4. The outer section 3 has its sides bent inwardly upon themselves to provide flanges 5 for guiding the sliding movement of the sections. The flanges consequently provide grooves which may be lubricated to facilitate the sliding adjustment of the sections.

For the purpose of removably holding the sections of the combination members in various adjusted positions I provide the sides thereof with a plurality of uniformly spaced openings 6 which are at times arranged in alinement with each other to receive my improved fastening elements 8. One end each of these elements has an eye 9 connected thereto in which is connected one end of the chain 10 the opposite end being connected to the outer side of the section through the medium of an eye 11. The opposite end of each element 8 is bifurcated and has a plate 12 pivotally mounted therein which serves to prevent accidental displacement of the elements from position within the opening. A ring 13 is pivotally connected to the intermediate portion of the end section adjacent the inner end thereof and serves to facilitate the adjustment of the sections.

For the purpose of removably connecting the combination members 1 and 2 to the bottom of the truck so that they will serve as either a skid or as standards and also for limiting the inward movement of the inner section 4 in the outer section 3 I have provided my novel engaging means. In the present instance this means consists of a hollow stem 14 within which is placed a wood block 15 for strengthening purposes, the stem being placed within the end of the outer section of the members 1 and 2 and retained in this position through the medium of rivets or like fastening devices 16 the outer end of the stem is reduced to provide a shoulder 17 arranged in alinement with the adjacent ends of the sections 3 for the purpose to be hereinafter described. The stem terminates in a hook 18 and the hooks are engageable with the openings 1 in the bottom 2 of the truck body when the device serves as a skid. When serving as standards the stems are placed within the openings A until the shoulders 17 and the inner ends of the sections 3 abut the bottom for supporting the members.

For the purpose of frictionally connecting the sections of one member to the sections of the adjacent member I have provided chains 19, the respective ends of which are engaged in eyes 20 carried by the adjacent sections. In Fig. 7 of the accompanying drawings I have shown a slightly modified form of my invention, the hook 18 in this instance having an elongated shank 21 formed integral therewith and integral with the stem 15. This arrangement permits of the members being swung from a position which engages the ground where they serve as skids to a vertical position to consequently allow the shoulders to abut the bottom 2 to allow the members to serve as standards. To facilitate engagement of the sections with the ground the outer ends of each of the sections are cut diagonal as indicated by the numeral 22.

I desire that great stress be laid upon the arrangement of the members 1 and 2 which can be either used as a skid or as standards. Attention is also directed to the novel means for connecting the members to the bottom of a truck in either of their positions as well as the means for adjustably connecting the sections to each member.

From the above description taken in connection with the accompanying drawings it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent is:—

A combination skid and standard comprising a pair of channel members each having their longitudinal edges bent inward, a second pair of channel members inserted into the first and having their longitudinal edges engaged within the bent edges of said first channel members, all of said members having openings adapted for registration, bolts inserted into registering openings of said members, flexible elements connecting bolts of each pair of first channel members, flexible elements connecting opposite points of said second channel members, and hooked elements mounted in the ends of the first channel members to engage a truck body.

In testimony whereof I affix my signature in presence of two witnesses.

WILLIAM R. GOLDING.

Witnesses:
 CHAS. M. JOHANSON,
 CHAS. F. SOBERG.

Copies of this patent may be obtained for five cents each, by addressing the "Commissioner of Patents, Washington, D. C."